US012711158B2

(12) United States Patent
Kovachev et al.

(10) Patent No.: US 12,711,158 B2
(45) **Date of Patent: *Aug. 18, 2026**

(54) INTERACTIVE ADAPTATION OF MACHINE LEARNING MODELS FOR TIME SERIES DATA

(71) Applicant: Treasure Data, Inc., Mountain View, CA (US)

(72) Inventors: Dilyan Kovachev, Bridgeport, CT (US); Gurbaksh Sharma, Karnal (IN)

(73) Assignee: Treasure Data, Inc., Mountain View, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 18/752,503

(22) Filed: Jun. 24, 2024

(65) Prior Publication Data

US 2024/0346050 A1 Oct. 17, 2024

Related U.S. Application Data

(63) Continuation of application No. 17/748,245, filed on May 19, 2022, now Pat. No. 12,061,632.

(30) Foreign Application Priority Data

Mar. 29, 2022 (IN) ............................ 202211018301

(51) Int. Cl.
*G06F 16/20* (2019.01)
*G06F 16/2458* (2019.01)
(Continued)

(52) U.S. Cl.
CPC ........ *G06F 16/287* (2019.01); *G06F 16/2477* (2019.01); *G06F 16/25* (2019.01); *G06F 16/288* (2019.01); *G06F 18/214* (2023.01)

(58) Field of Classification Search
CPC .... G06F 16/287; G06F 16/2477; G06F 16/25; G06F 16/288; G06F 18/214
(Continued)

(56) References Cited

U.S. PATENT DOCUMENTS 10,268,753 B2 * 4/2019 Bar-Or ................ G06F 16/2455
11,175,910 B2 * 11/2021 Gowda ............... G06F 16/1774
(Continued)

FOREIGN PATENT DOCUMENTS

EP 2973051 * 1/2016
EP 2973051 A2 1/2016

OTHER PUBLICATIONS

Sethi et al., "Presto: SQL on Everything". IEEE 2019.*
(Continued)

*Primary Examiner* — Daniel A Kuddus
(74) *Attorney, Agent, or Firm* — Baker Botts L.L.P.

(57) ABSTRACT

A computer-implemented method can comprise establishing programmatic connections to a digitally stored first database comprising over one million records, each of the records comprising time series data organized as an event with a timestamp and event data, the first database being a multi-tenant data store programmatically coupled to a warehouse manager and a query engine, reading a configuration file that specifies one or more tables in the first database and for each particular table among the one or more tables, forming and submitting a plurality of queries to the first database to receive a set of aggregated records of the first database, training a machine learning model using a portion of the aggregated records, receiving, from a second computer, input specifying a plurality of hyper-parameters for the machine learning model, evaluating the aggregated records of the first database using the machine learning model to output forecasted event data.

20 Claims, 11 Drawing Sheets

(51) Int. Cl.
*G06F 16/25* (2019.01)
*G06F 16/28* (2019.01)
*G06F 18/214* (2023.01)

(58) Field of Classification Search
USPC ........ 707/737, 750, 768, 648, 672, 688, 735
See application file for complete search history.

(56) References Cited

U.S. PATENT DOCUMENTS 11,494,362 B2 * 11/2022 Gerweck ............. G06F 16/2282
11,636,124 B1 * 4/2023 Narayanaswamy ......................... G06F 18/2148 707/776
2014/0279838 A1 * 9/2014 Tsirogiannis ......... G06F 16/235 707/603
2016/0335318 A1 * 11/2016 Gerweck ............... G06F 16/283
2017/0286502 A1 10/2017 Bar-Or et al.
2017/0286526 A1 * 10/2017 Bar-Or ...................... G06F 8/34
2018/0181867 A1 * 6/2018 Seibold ................. G06F 18/217
2018/0191867 A1 * 7/2018 Siebel ....................... G06F 8/10
2019/0265971 A1 8/2019 Behzadi et al.
2020/0142895 A1 * 5/2020 Gerweck ........... G06F 16/24542
2020/0218721 A1 * 7/2020 Saini ..................... G06F 16/248
2020/0349468 A1 * 11/2020 Arya ..................... G06F 18/214
2020/0394455 A1 * 12/2020 Lee ........................ G06N 20/00
2021/0365611 A1 * 11/2021 Agrawal ................ G06N 20/00

OTHER PUBLICATIONS

Sadayuki Furuhashi, Automating Workflows for Analytics Pipelines, Open Source Summit Japan 2017; Jun. 2017, 28 pages.
Raghav Sethi et al., Presto: SQL on Everything, 2019 IEEE 35th International Conference on Data Engineering (ICDE), 2019, 12 pages.
Hortonworks, Using Apache Hive, https://docs.hortonworks.com, Aug. 26, 2019, 45 pages.

* cited by examiner 810 820 835

Model Performance Summary 830

Model Params Summary

| session_id | event_date | training_start | fcst_start | fcst_periord | decomp_method | seasonality | trend | Mean | RMSE | rmse_std_radio | rmse_zscore |
|---|---|---|---|---|---|---|---|---|---|---|---|
| 52263985 | 9/9/21 | 2016-1-1 | 2021-8-6 | 30 | multiplicative | 7 | add | 5856.33 | 1199.48 | 0.48 | -1.88 |
| 52267299 | 9/9/21 | 2016-1-1 | 2021-8-6 | 30 | multiplicative | 7 | add | 5856.33 | 1202.95 | 0.49 | -1.88 |
| 52282228 | 9/9/21 | 2016-1-1 | 2021-8-6 | 30 | additive | 6 | add | 5856.33 | 3940.13 | 1.59 | -0.77 |
| 52286922 | 9/9/21 | 2016-1-1 | 2021-8-6 | 30 | multiplicative | 7 | add | 5856.33 | 1263.74 | 0.51 | -1.86 |

INTERACTIVE ADAPTATION OF MACHINE LEARNING MODELS FOR TIME SERIES DATA

BENEFIT CLAIM

This application claims the benefit under 35 U.S.C. § 120 as a continuation of application Ser. No. 17/748,245, filed May 19, 2022, which claims the benefit under 35 U.S.C. § 119 of Indian patent application No. 202211018301, filed Mar. 29, 2022, the entire contents of which is hereby incorporated by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. @ 2021-2022 Treasure Data, Inc.

TECHNICAL FIELD

One technical field of the present disclosure is computer-implemented methods of transformation of large-scale datasets in large-scale databases, including time series analysis. Another technical field is automated control of data transformation workflows using scripts and configuration files. Yet another technical field is artificial intelligence and machine learning models that are configured to execute time series forecasting techniques, and the evaluation and adjustment of such models.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A time series is a sequence of data points representing samples or observations of events often collected at discrete and equally spaced time intervals. Time series analysis and forecasting models analyze existing event data with timestamps and forecast future event data for time-varying phenomena.

As the ability to collect time series data grows, the size of the data grows at scale as well, often collecting millions of rows of event data. Processing this size of event data can be a cumbersome and difficult process. Present methods and tools for analyzing large time series data are time-consuming and may not be scalable past more than 10 million rows of event data. They also do not allow for easy customization to different client data or test multiple model hyper-parameters.

Therefore, a one-stop adaptive time series analysis and forecasting model that has a parametrized, scalable workflow would have valuable utility. Example practical applications include analyzing and forecasting time series data such as web traffic activity, sales data, foot traffic activity, or email activity. Another application is determining hyper-parameters such as trends, seasonality, or outliers for business activities. The resulting information can inform strategies for planning marketing campaigns or seasonal promotions.

PRESTO is an open-source distributed SQL query engine for running interactive analytic queries against data sources of all sizes ranging from gigabytes to petabytes. Presto was designed and written from the ground up for interactive analytics and approaches the speed of commercial data warehouses while scaling to the size of organizations like Facebook. Presto is commercially available at the time of this writing at the domain prestodb.io. APACHE HIVE data warehouse software facilitates reading, writing, and managing large datasets residing in distributed storage using SQL. HIVE is commercially available at the time of this writing at the internet domain hive.apache.org. DIGDAG is an open-source library for data pipeline orchestration and is commercially available from Treasure Data, Inc., Mountain View, California.

SUMMARY

The appended claims may serve as a summary of the invention.

BRIEF DESCRIPTION OF THE DRAWINGS

In the drawings:

FIG. 8 illustrates an example computer display device with a graphical user interface showing visualizations of a summary table summarizing the input parameters, hyper-parameters, and performance indicators of the time series analysis and forecasting model.

DETAILED DESCRIPTION

Figure 1:
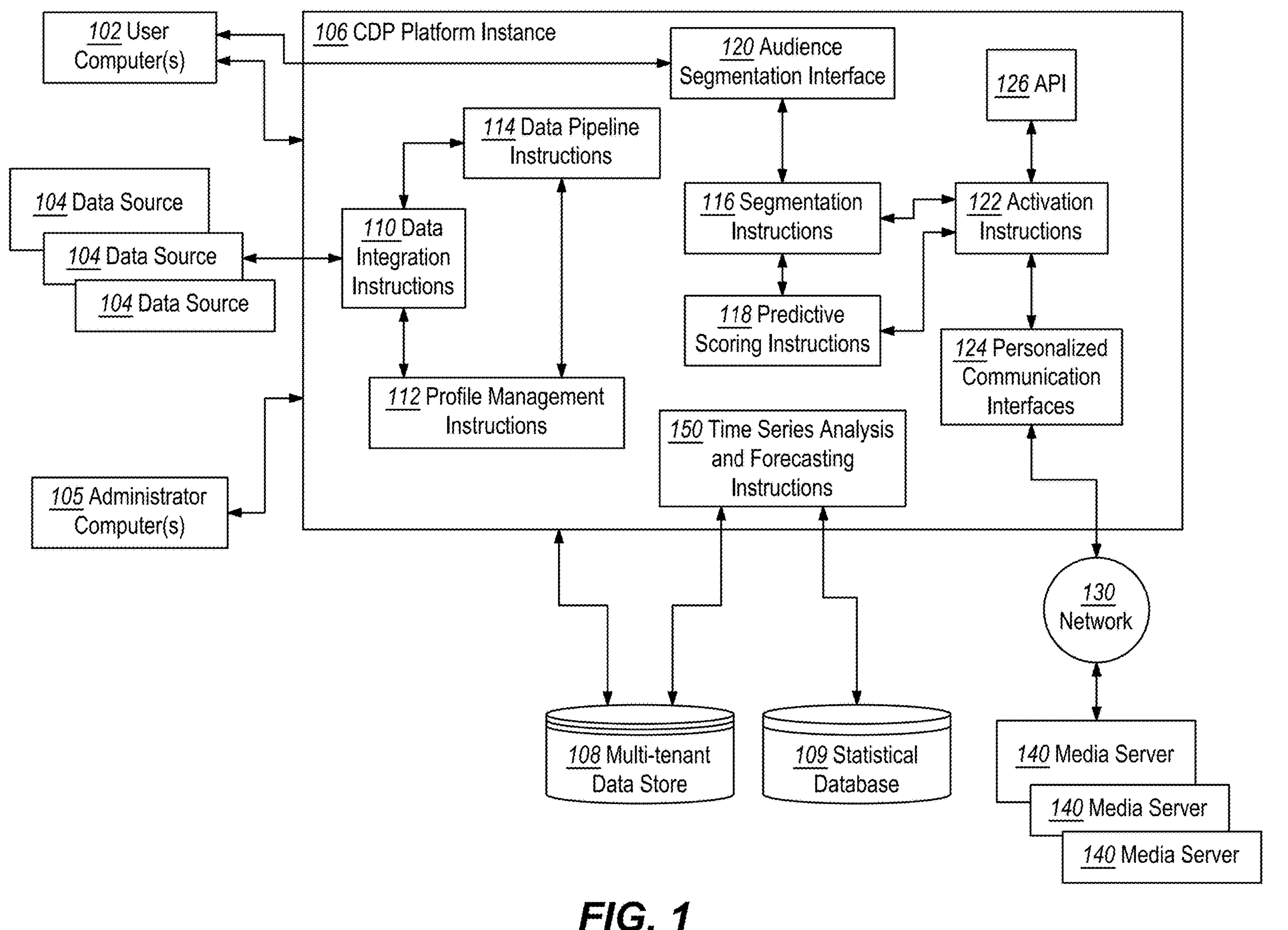
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:

1. General Overview
2. Structural & Functional Overview
3. Implementation Example—Hardware Overview

1. General Overview

In one embodiment, a computer-implemented method executes rapid time series analysis and forecasting (TSAF) on time series data. Embodiments enable data engineers, marketers, and business analysts to analyze time series data and forecast future event data with a parametrized, scalable workflow and robust end-to-end solution. Embodiments can be highly scalable for time series data with millions of rows and can allow for customization to different client data and an easy way to test multiple model hyper-parameters. Embodiments also can provide automated updating and saving visualizations that can be easily exported.

Embodiments can assist machine learning engineers, marketers, and business analysts in analyzing time series data such as web traffic activity, sales data, foot traffic activity, and email activity and discover patterns in the data such as trends and seasonality that can be used to forecast future activity and plan promotional campaigns. Embodiments are programmed to use only PRESTO and HIVE functions and DIGDAG code to ensure high computing efficiency and scalability on big-data volume, which is typical for behavioral tables with one-to-many relationships. Embodiments can provide outputs that enable viewing original activity data as a time plot; identifying or discovering collinearity, trend, and seasonality in the data; identifying patterns in the data by hour of day, week of month, quarter of year, and year; discover top-K outlier values in the data and plot them by date and year; use an ensemble of machine learning models for time series such as ARIMA, SARIMA, exponential smoothing, fbProphet linear and non-linear models to forecast future activity; store a historic table of model training and optimization steps and model key performance indicators to track metrics that improve model performance over time and ensure that the model can be used with high confidence.

The disclosure is directed to those who understand and are experienced in using PRESTO, DIGDAG, PYTHON custom scripts, time series methods, and data analytics platforms. A commercial example of an analytics platform is TREASURE INSIGHTS from Treasure Data, Inc., which also commercially offers DIGDAG.

In various embodiments, the disclosure encompasses the subject matter of the following numbered clauses:

1. A computer-implemented method, comprising: using a first computer, establishing programmatic connections to a digitally stored first database comprising over one million records, each of the records comprising time series data organized as an event with a timestamp and an event data, the first database being part of a HADOOP cluster that is programmatically coupled to a HIVE data warehouse manager and a PRESTO query engine; using the first computer, reading a configuration file that specifies one or more tables in the first database and for each particular table among the one or more tables, forming and submitting a plurality of PRESTO queries to the first database, each of the PRESTO queries specifying one or more data aggregation operations, and in response thereto, receiving a set of aggregated records of the first database; training a machine learning model using a portion of the aggregated records as a training dataset; using the first computer, determining a plurality of outlier values that are represented in the set of aggregated records, one or more change points that are represented in the set of aggregated records, a plurality of seasonality patterns that are represented in the set of aggregated records; using the first computer receiving, from a second computer, input specifying a plurality of hyper-parameters for the machine learning model; using the machine learning model with the hyper-parameters, evaluating the aggregated records of the first database using the machine learning model to output forecasted event data as a second time series; generating presentation instructions which when rendered using a computer display device cause displaying one or more graphical visualizations in a graphical user interface of the computer display device, the graphical visualizations comprising a time series analysis, a graphical timeline of forecasted event data, and a performance summary of the machine learning model.
2. The method of clause 1, further comprising: the presentation instructions being programmed, when rendered using the computer display device, to cause displaying, in the one or more graphical visualizations in the graphical user interface of the computer display device, a time series plot comprising a line chart comprising one or more graph lines graphing one or more event data values, outlier values, and change point values against their corresponding timestamp data.
3. The method of Clause 1, further comprising: the presentation instructions being programmed, when rendered using the computer display device, to cause displaying, in the one or more graphical visualizations in the graphical user interface of the computer display device, an autocorrelation-partial autocorrelation bar chart comprising graphical bars representing autocorrelation and partial autocorrelation factors, each of the bars corresponding to one lag, each of the bars having a height that is proportional to a magnitude of value of the autocorrelation or partial autocorrelation factors, each of the bars representing partial autocorrelation factors may have a positive or negative value.
4. The method of Clause 1, further comprising: the presentation instructions being programmed, when rendered using the computer display device, to cause displaying, in the one or more graphical visualizations in the graphical user interface of the computer display device, one or more line charts comprising one or more graph lines graphing seasonality values, trend values, residual values, and actual values against their corresponding timestamp data.

5. The method of Clause 1, further comprising: the presentation instructions being programmed, when rendered using the computer display device, to cause displaying, in the one or more graphical visualizations in the graphical user interface of the computer display device, a range label widget comprising a graphical arm displaying seasonality values, a box item corresponding to the number of seasonality values, and a box item corresponding to the average seasonality value.

6. The method of clause 1, further comprising: the presentation instructions being programmed, when rendered using the computer display device, to cause displaying, in the one or more graphical visualizations in the graphical user interface of the computer display device, one or more line charts comprising one or more graph lines corresponding to one or more years of aggregated event data, graphing the aggregated event data values against a period of time.

7. The method of clause 1, further comprising: the presentation instructions being programmed, when rendered using the computer display device, to cause displaying, in the one or more graphical visualizations in the graphical user interface of the computer display device, a circle widget comprising at least two are segments, one of the arc segments having an arcuate length that represents a proportion of outliers of a year among all years' outliers.

8. The method of clause 1, further comprising: the presentation instructions being programmed, when rendered using the computer display device, to cause displaying, in the one or more graphical visualizations in the graphical user interface of the computer display device, a bar chart comprising graphical bars representing top K outliers, each of the bars corresponding to the timestamp of a top outlier, each of the bars having a height that is proportional to a magnitude of the top outlier's value.

9. The method of clause 1, further comprising: the presentation instructions being programmed, when rendered using the computer display device, to cause displaying, in the one or more graphical visualizations in the graphical user interface of the computer display device, one or more line charts comprising one or more graph lines corresponding to actual event data and forecasted event data, the values of which are plotted against their corresponding timestamp data.

10. The method of clause 9, further comprising: the presentation instructions being programmed, when rendered using the computer display device, to cause displaying, in the one or more graphical visualizations in the graphical user interface of the computer display device, one or more line charts comprising one or more graph lines corresponding to training event data and forecasted event data, the values of which are plotted against their corresponding timestamp data.

11. The method of clause 10, further comprising: the presentation instructions being programmed, when rendered using the computer display device, to cause displaying, in the one or more graphical visualizations in the graphical user interface of the computer display device, one or more area charts comprising one or more areas corresponding to forecasted event data with upper confidence intervals, forecasted event data, and forecasted event data with lower confidence intervals, the values of which are plotted against their corresponding timestamp data.

12. The method of clause 10, further comprising, the presentation instructions being programmed, when rendered using the computer display device, to cause displaying, in the one or more graphical visualizations in the graphical user interface of the computer display device, a table specifying, for a plurality of named columns, two or more of: session ID, forecasted period, decomposition method, seasonality values, trend, mean, and RMSE.

The foregoing embodiments, features, and aspects are examples of the subject matter of the disclosure and other embodiments, features, and aspects will be apparent from other sections of the disclosure.

2. Structural & Functional Overview

2.1 Example Distributed Computer System Implementation

FIG. 1 illustrates a distributed computer system showing the context of use and principal functional elements with which one embodiment could be implemented.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, a plurality of user computers 102, data sources 104, administrator computers 105, multi-tenant data store 108, statistical database 109, and network 130 are communicatively coupled to a customer data platform (CDP) instance 106. Each of the user computers 102 and administrator computers 105 comprises any desktop computer, laptop computer, tablet computer, smartphone, or other computing device and may be coupled directly or indirectly via one or more network links. User computers 102 can be associated with end users who interact with programs of CDP instance 106 to generate time series analysis data, forecasted event data, and/or generate or view visualizations of the time series analysis data and forecasted event data in the manner described in other sections. Administrator computers 105 can be associated with other end users who are responsible for configuring, managing, or administering the CDP instance 106.

Each of the data sources 104 can be a networked, digitally stored time series data repository of records of transactions, communications, impressions, or other time series data concerning an interaction of an enterprise with customers of the enterprise. The data sources 104 are conceptually external to the CDP instance 106 and can be associated with an enterprise that has a customer relationship with thousands to millions of customers. Examples include retailers or distributors of goods, service providers, or consolidators. In one example, a data source 104 can hold records with timestamps concerning sales of goods of an enterprise, such as sales data, web traffic activity, and foot traffic activity.

In an embodiment, the multi-tenant data store 108 is a large-scale data repository that stores records that the CDP platform 106 manages and uses to conduct operations for multiple different enterprises that have a customer relationship with the owner or operator of the CDP platform 106. Thus, the CDP platform 106 can provide services to a large number of different enterprises, and all data created by the CDP platform for all enterprises can be centrally stored in multi-tenant data store 108, under the control of security algorithms that prevent user computers 102 of one enterprise from accessing, using, or viewing the data of a different enterprise. In one implementation, data store 108 can be an APACHE HADOOP cluster of repositories or databases.

In an embodiment, the statistical database 109 is a digital data repository that is programmed to store time series analysis and forecasting data concerning the data sources 104 and data to support visualization operations that the CDP instance 106 generates in the manner further described in other sections herein. Broadly, as further described in other sections, the CDP instance 106 is programmed to read data sources 104, generate time series analysis and forecasting data, store the time series analysis and forecasting data in statistical database 109, and generate and cause displaying a plurality of different visual representations of the time series analysis and forecasting data on computer display devices with graphical user interfaces. In some embodiments, the statistical database 109 can be integrated with a multi-tenant data store 108.

In an embodiment, network 130 can be one or more local area networks, wide area networks, or internetworks, using any wired or wireless, terrestrial or satellite data links. In an embodiment, the media servers 140 comprise networked computers that can be called or instructed, from CDP instance 106, to cause dispatching communications to user computers 102 or other entities in the manner described in other sections herein.

In an embodiment, the CDP platform 106 comprises sequences of executable stored program instructions that are organized in the functional units, packages, and elements shown in FIG. 1 and executed or hosted using one or more virtual computing instances in a private data center, public data center, and/or cloud computing facilities. In an embodiment, the CDP platform 106 can include: data integration instructions 110, which are coupled to data sources 104 as inputs and also coupled to data pipeline instructions 114 and profile management instructions 112, the data pipeline instructions and profile management instructions being capable of interoperation; segmentation instructions 116 coupled to the data pipeline instructions 114, to predictive scoring instructions 118, and an audience segmentation interface; activation instructions 122, which are coupled to segmentation instructions 116 and predictive scoring instructions 118 as well as to personalized communication interfaces 124 and an application programming interface (API) 126. Segmentation instructions 116 are coupled to an audience segmentation interface 120 that is programmed to interact with user computers 102 to define audience segments and campaigns.

The foregoing elements are programmed, broadly, to obtain data from the data sources 104; process the data via data integration instructions 110, for example to normalize and/or clean the data for storage in multi-tenant data store 108; to further process the data via data pipeline instructions 114 according to a programmed workflow or pipeline of steps under direction of the profile management instructions 112; to use segmentation instructions 116 and audience segment definitions received from audience segmentation interface 120, along with to predictive scoring instructions 118, to establish audience segments and campaigns for the purpose of transmitting communications to audiences of customers or other users; to communicate the segments and campaigns to activation instructions 122, which are programmed to activate campaigns on a plurality of different communication channels such as email, text messaging, or automatic calls; and to dispatch individual communications of a campaign via personalized communication interfaces 124 toward media servers 140 for communication to customers or users. Activations can also be initiated via calls to the API 126 from external systems.

The foregoing is a generalized and broad description of the operations of CDP instance 106, in one embodiment. A complete description of all possible operations and uses of CDP platform 106 is beyond the scope of this disclosure and would obscure the focus of this disclosure. An example of a CDP platform 106 is the TREASURE DATA platform commercially available from Treasure Data, Inc. and Treasure Data K.K., which is fully described and documented at the time of this writing in publications available at the domain "treasuredata" in the COM global top-level domain of the World Wide Web. Those using this disclosure are presumed to have familiarity with programming, architecting, and implementing CDP platforms of the type described in the preceding publications. The ability to create a working implementation based on this disclosure may also involve having knowledge and skill with PRESTO, HIVE, DIGDAG from Treasure Data, and TREASURE INSIGHTS from Treasure Data.

The CDP platform 106 of FIG. 1 further comprises time series analysis and forecasting (TSAF) instructions 150, which are programmed, in general, to obtain data from multi-tenant data store 108 for tables and columns represented in the data store that were created and stored based on the data sources 104, to generate time series analysis and forecasting data via aggregation algorithms, machine learning algorithms and/or statistical algorithms, and to generate presentation instructions that are programmed to cause displaying graphical visualizations of the time series analysis and forecasting data on computer display devices having graphical user interfaces. In an embodiment, TSAF instructions 150 are coupled to statistical database 109 to store time series analysis and forecasting data generated from records of multi-tenant data store 108. The labels time series analysis and forecasting, and TSAF, are used merely for convenience, and functionally equivalent implementations can use other names or labels.

TSAF instructions 150 can be programmed to solve the problems described in the Background of this disclosure. In an embodiment, TSAF instructions 150 are programmed to use PRESTO and HIVE functions and operations that can loop through a list of database tables in multi-tenant data store 108 and extract or calculate time series analysis and forecasted event data from each table, using aggregation in some cases, potentially reducing tables of 100,000,000 rows or more into as small as thousands of rows depending on the tables that the user computer 102 requests to explore and the aggregation time intervals determined by the user computer 102, of condensed descriptive statistics. The resulting aggregated tables can be stored in statistical database 109 and used in an in-memory data model that powers a visual dashboard and other graphical visualizations. As later sections will show, TSAF instructions 150 can be programmed to generate graphical visualizations and interface elements that can be used with user computers 102 associated with non-technical users. Execution of TSAF instructions 150 can be controlled by a configuration file that specifies data to inspect and the minimum requirements of data to trigger an output, as further described in other sections herein. TSAF instructions 150 can be programmed with filters to exclude data with undesired timestamps.

Figure 2:
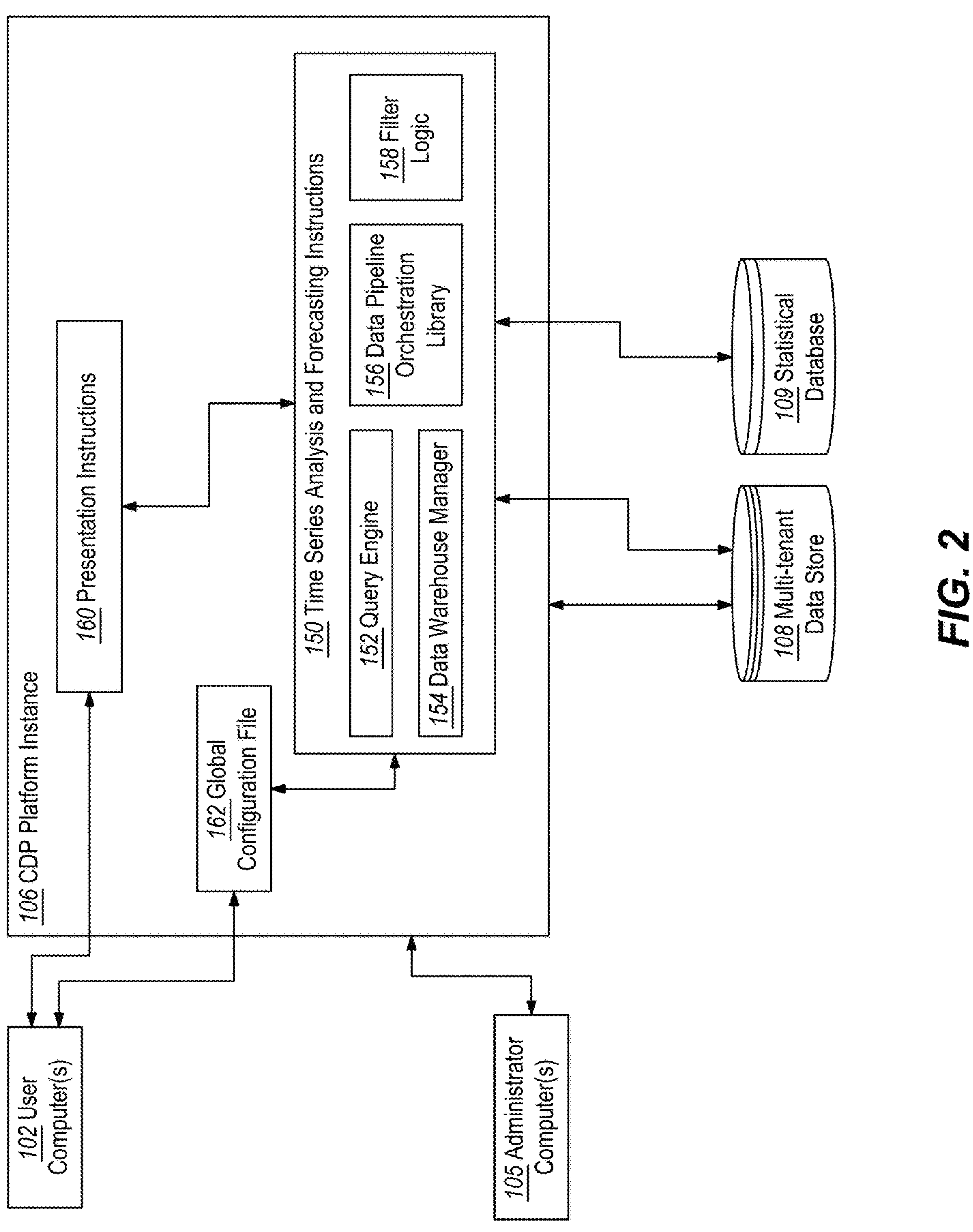
FIG. 2 illustrates the system of FIG. 1 with a focus on time series analysis and forecasting instructions of one implementation.

FIG. 2 illustrates the system of FIG. 1 with a focus on the time series analysis and forecasting instructions and database tables of one implementation. In an embodiment, TSAF instructions 150 comprise a query engine 152, data warehouse manager 154, data pipeline orchestration library 156, and filter logic 158. In one implementation, the query engine 152 can be the PRESTO query engine; the data warehouse manager 154 can be the APACHE HIVE data warehouse system; and the data pipeline orchestration library 156 can be DIGDAG from Treasure Data. APACHE HIVE is a data warehouse system that uses APACHE HADOOP data repositories and that facilitates data summarization, ad-hoc queries, and the analysis of large datasets stored in various databases and file systems that integrate with HADOOP. HIVE can apply structure to large amounts of unstructured data and then perform batch SQL-like queries on that data. A "query," as used in other sections herein, can be a HIVE job that includes one or more SELECT or DML queries using the HIVE query language (HIVEQL), which can be processed using query engine 152 via PRESTO and executed using the HADOOP MapReduce framework. The standard Hive 0.13 HiveQL and Hive 2.x ANSI SQL are documented together at the time of this writing in the subdomain "hive" of the domain "apache.org" on the internet. PRESTO is an open-source distributed SQL query engine for running interactive analytic queries against data sources of all sizes ranging from gigabytes to petabytes, which is documented at the time of this writing at the domain "prestodb.io" on the internet.

The filter logic 158 can be coded in C++, C, JAVA, or a similar source programming language to receive input specifying the desired time series data type and time intervals. For example, filter logic 158 can be programmed to generate one or more GUI panels, each associated with a particular filter type, arranged in a hierarchical or cascading chain of filters that allow selecting particular time intervals of the data or other values to include or not include.

In an embodiment, TSAF instructions 150 can be coupled to a global configuration file 162 that digitally stores data values and/or is programmed with instructions to control the operation of the TSAF instructions. In an embodiment, TSAF instructions 150 can be coupled to presentation instructions 160, which are programmed to generate dynamic HTML or other forms of presentation instructions which, when rendered or executed at a computer having a display device having a graphical user interface, cause displaying graphical visualizations of the time series analysis and forecasting results on the computer display device.

The global configuration file 162 can be a digitally stored JSON blob or a static flat file of name-value pairs, for example. In one embodiment, the configuration file 162 comprises a plurality of instructions and parameters that control a flow of execution of the TSAF instructions 150. For example, in one implementation, a config/global.yml file expressed in Yet Another Markup Language (YAML) is created and stored in a project folder and contains parameters and commands that define a workflow. In an embodiment, an execution workflow of the processes described herein will vary based on whether certain parameters in the global configuration file 162 are set to YES or NO or other values. The execution controller 110 is programmed to read the configuration file 162, parse each configuration line, and control execution of the TSAF instructions 150 as specified in the configuration file. An architecture with an execution controller 110 that is data-driven by the configuration file 162 enables a non-programmer user to modify a flow of execution of the system described herein by changing values in the configuration file. In other embodiments, a functionally equivalent system could use a graphical user interface to receive input to specify control values to change the execution flow rather than relying on a relatively static configuration file. Thus, a GUI front-end could be developed to receive and set values in memory based on user input to GUI widgets rather than reading a previously prepared configuration file.

Configuration file 162 can specify an input database and tables, output tables, data pre-processing, and aggregation parameters, custom data filter parameters, Python code global parameters, and ensemble model parameters in different sections. For convenience, this disclosure presumes that certain machine language models and forecasting code have been coded in Python, but other embodiments can use different script languages or programming languages for models or forecasting and Python is identified merely to specify a clear example. Example configuration parameters for the input database and tables may include:

- sink_database: the name of the database where output tables will be stored.
- source_table: the name of the original time series event table. Typically, the table is defined with one-to-many relationships where each row is an event with a timestamp and contextual metrics related to the event. Examples include pageviews with a URL or order events with a sales amount.

Example configuration parameters for output tables can include:

- output_table_prefix: a prefix value to be used in output table names, enabling customization of the names of output tables based on the activity that is the subject of forecasting. Example values include "web traffic," "web activity," and "total sales."
- original_data: the name of the table with the original source data, aggregated by timestamp and with sum or count values for the data for which forecasting is desired.
- hourly/weekly data: the name of the tables that aggregate the event data by hour of week or week of month.

Example data pre-processing and aggregation parameters can include:

- run_presto: YES-when set to YES, the TSAF instructions 150 execute the data pre-processing PRESTO functions first to aggregate large-scale input datasets. In an embodiment, the default value is to run at first, and then change to NO for subsequent runs in which Python time series code is executed on data that already has been aggregated via the PRESTO functions.

unixtime_column: the name of the timestamp column in the original time series event table. Although the UNIXTIME format is specified, other embodiments could use other time formats.

tstamp_aggregation: used to control how the timestamp column is aggregated: daily, weekly, monthly, or yearly. Example values are d!, m!, y!.

activity_aggregation_syntax: specifies a syntax for use in a query to cause event data aggregation. Examples include COUNT (*) for web traffic activity and SUM (amount_paid)) for total sales.

aggregate_col_name: specifies a name of an aggregation column that will be forecasted; examples could include page_views, total_sales, email_opens.

Example custom data filter parameters include:

filter_regex: enables applying conditional filers on the original time series table if only some types of the data, for example, pageviews of a website, needs analysis or forecast. An example value is: REGEXP_LIKE (dm_url, 'domain.com'), which specifies analyzing pageviews of the "domain.com" website.

apply_time_filter: NO-when set to NO, then the entire time-history of the original event data will be aggregated and analyzed. If set to YES, then the TSAF instructions 150 are programmed to read the start_date parameter and select only events from the start_date to the current date.

Example Python code global parameters include the following. Importantly, these parameters control the timing of execution of forecasting models:

api_server: '<https://api.domain.com>'. Specifies a URL of an instance at which source data is stored.

run_python: NO or YES-when set to NO, the TSAF instructions 150 are programmed to execute data pre-processing and aggregation queries, for example, via PRESTO, but not a machine learning forecasting model that has been defined in Python. In general, a first iteration of the workflow and processes herein will be run with this parameter value set as NO to enable inspection of the original table aggregations before the data is evaluated using a machine learning model.

RUN_GET_TS_FEATURES: NO or YES-when set to YES, the TSAF instructions 150 are programmed to execute time series analysis to determine analytical values such as seasonality, trend, and collinearity. The analytical values normally dictate which machine learning model hyper-parameters are used in a forecasting model. Therefore, YES is normally used after aggregation, but before forecasting. After the analytical values are known, one or more machine learning model hyper-parameters can be set or updated. Thereafter, the value of the parameter can be changed to NO, which will cause the TSAF instructions 150 to execute forecasting functions by evaluating the machine learning model using the specified hyper-parameters.

RUN_FORECAST: YES-when set to YES, the TSAF instructions 150 are programmed to execute the forecasting model. When set to NO, the TSAF instructions 150 are programmed to not execute the forecasting model. The value normally is set to NO when the preceding parameter is YES to cause obtaining the analytical values as specified above and then changed to YES when the analytical values are known.

Example ensemble model parameters include:

trend: specifies a trend calculation process to use during time series analysis and generation of analytical parameters. Values can be, for example, "add" for a linear trend and "mul" for an exponential trend.

seasonality_length: specifies a seasonality number that was determined in the time series analysis step. The value can be set based upon discovery of seasonality, PACF and ACF analysis. For example, if a daily time series has weekly seasonality, the parameter value can be "7"; if monthly seasonality is noted, the value can be "12".

decomposition_method: sets a decomposition method. For example, a value can be "multiplicative" when the magnitude of the seasonal pattern in the data depends on the time/date component.

forecast_steps: Specifies the number of steps ahead the forecast model should predict;

an example value can be "30" for 30 days. Typically, the number of days represented in the source data is 3× the value of this parameter.

In embodiments that use TREASURE INSIGHTS or similar downstream analytical software, the following parameter values can be specified:

update_model: YES-when set to YES, the output tables are sent to a TREASURE INSIGHTS model or another external system.

model_oid: the OID of a TREASURE INSIGHTS model that powers the dashboard GUI displays, in one embodiment. Other embodiments can be coded with presentation instructions to generate the GUI dashboard examples that are shown herein rather than invoking an external service for presentation.

Implementations using DIGDAG as the data pipeline orchestration library 156 can execute using the following files. "ml_web_traffic_forecasting.dig" can be a main project workflow that executes the end-to-end solution with sub workflows. The main workflow can be automated and scheduled so that a model and dashboards can be updated at a desired frequency. "presto_queries.dig" can be a sub workflow that executes data pre-processing and aggregation needed for training a machine learning model in Python and generating dashboard views. "python_code.dig" can be a sub workflow that runs last, and reads from the output tables of the presto_queries.dig workflow and executes time series analysis and forecasting functions in Python.

In an embodiment, TSAF instructions 150 can be programmed to output time series analysis and forecasting results, which have been calculated as described above and in other sections herein under the control of the global configuration file 162 and store the statistical metrics in tables in statistical database 109. In one embodiment, table outputs to statistical database 109 include the following, in which PREFIX refers to the output_table_prefix parameter that has been specified in the global configuration file 162:

PREFIX_original_data—a table that contains the aggregated event data by desired time period.

PREFIX_hourly_—a table that contains the aggregated event data by hours.

PREFIX_weekly_data—a table that contains the aggregated event data by weeks and quarters.

PREFIX_get_seasonality_data—a table with a list of seasonality values, if seasonality is detected in the original data.

PREFIX_outlier_change_point_data—a table with a list of outliers and change point periods.

PREFIX_seasonal_trend_component—a table with metrics such as trend, seasonality, and residuals.

PREFIX_train_forecast_data—a table with a training dataset used for training a time series forecast model.

PREFIX_val_pred_data—a table with validation dataset used for testing model predictions and calculating key performance indicators ("performance KPIs").

PREFIX_model_summary—a table that contains a summary of model hyper-parameters, time of training, and performance KPIs.

PREFIX_forecast_data—a table that contains final forecast for the chosen forecast steps, including upper & lower Confidence Intervals for the predictions.

2.2 Example Programmed Process or Algorithm

Figure 3:
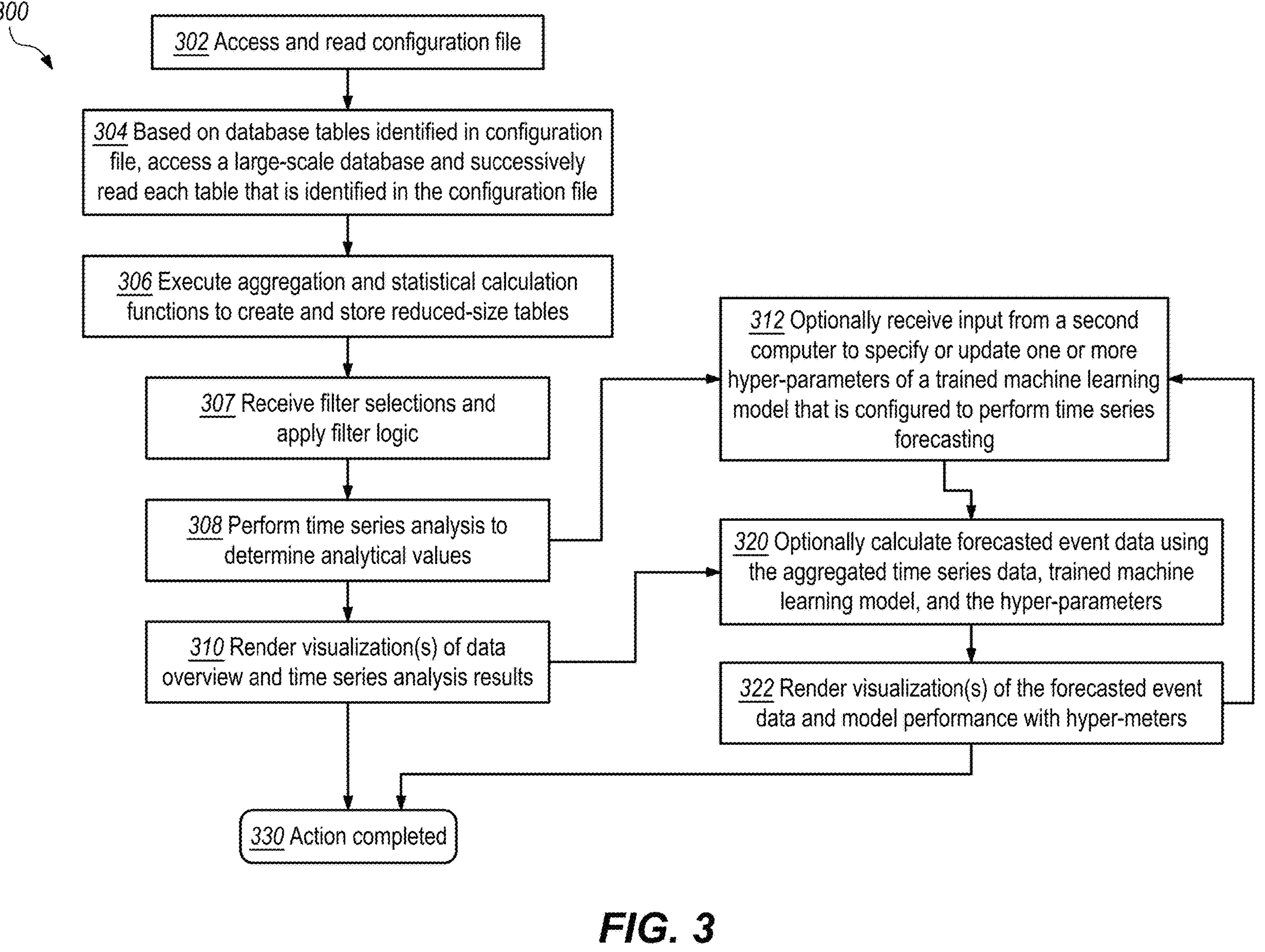
FIG. 3 illustrates an example computer-implemented process or algorithm for determining hyper-parameters for machine learning models for forecasted event data.

FIG. 3 illustrates an example computer-implemented process or algorithm for determining hyper-parameters and optionally calculating forecasted event data. FIG. 3 and each other flow diagram herein is intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

In the example of FIG. 3, a computer-implemented process 300 initiates execution at block 302 in which the process is programmed to access and read a configuration file. For example, the TSAF instructions 150 are programmed to read configuration file 162, parse its instructions, create in-memory variables or constants as specified in the file, and store control data to control further execution of the process.

At block 304, the process is programmed, based on database tables that are identified in the configuration file, to access a large-scale database and successively read each table that is identified in the configuration file. For example, the TSAF instructions 150 are programmed to read configuration file 162, identify a list of databases, tables, and/or columns, and iteratively access and read the specified databases, tables, and/or columns.

At block 306, the process is programmed to execute aggregation and calculation functions to create and store reduced-size tables. In one embodiment, execution of block 306 can comprise calling a plurality of PRESTO and HIVE functions to execute aggregation on the databases, tables, and/or columns that were identified at block 304 while concurrently analyzing aggregated time series event data relating to the databases, tables, and/or columns. As one implementation example for block 306, TABLE 1 shows a parameterized query that is programmed to read a list of tables from a YML configuration file and aggregate the event data.

TABLE 1

| PARAMETERIZED QUERY EXAMPLE |
|---|

```
WITH T1 as (
  SELECT * FROM ${sink_database}.${source_table}
  WHERE TD_TIME_RANGE(${unixtime_column}, '${start_date}')
)
performin SUM( ) or COUNT( ) based on YML
${activity_aggregation_syntax} param
SELECT
TD_TIME_STRING(CAST(CAST(${unixtime_column} AS DOUBLE)
```

TABLE 1-continued

| PARAMETERIZED QUERY EXAMPLE |
|---|

```
AS INTEGER), '${tstamp_aggregation}') as event_date,
hour(from_unixtime(${unixtime_column})) as event_hour,
${activity_aggregation_syntax} as ${aggregate_col_name}
from T1
${filter_regex}
group by 1,2
order by 1,2
```

TABLE 2 presents a version of the query of TABLE 1 in a clean form in which the configuration file has been processed to substitute values for the parameters of the query of TABLE 1 and thus dynamically generate a compete executable query.

TABLE 2

| CLEAN QUERY EXAMPLE |
|---|

```
DROP TABLE IF EXISTS "web_traffic_original_data";
CREATE TABLE "web_traffic_original_data" AS
WITH T1 as (
  SELECT * FROM ml_dev.td_dot_com_pageviews
  WHERE TD_TIME_RANGE(time, '2020-09-01')
)
SELECT
TD_TIME_STRING(CAST(CAST(time AS DOUBLE) AS INTEGER),
'd!') as event_date, hour(from_unixtime(time)) as event_hour,
COUNT(*) as page_views
from T1
WHERE REGEXP_LIKE(td_url, 'treasuredata.com')
group by 1,2
order by 1,2
```

At block 307, the process 300 is programmed to receive one or more selections of filters and to apply filter logic to select data of a desired kind or a desired interval of the original time series data.

At block 308, the process is programmed to execute time series analysis functions to create and store time series analysis results. In one embodiment, the execution of block 308 can comprise calling seasonality, trend, and collinearity functions to determine analytical values for seasonality, trend, and collinearity based on the aggregated records. Thus, the results of the time series analysis can include one or more seasonality, trend, and collinearity values that can be used to inform, specify, update, or otherwise determine hyper-parameters for a trained machine learning model. The hyper-parameters can be used to forecast event data in the manner described in other sections herein.

At block 310, the process is programmed to generate display instructions that are configured for rendering in a display device that supports a graphical user interface, a general data overview, or the results of time series analysis.

Optionally, at block 312, after block 308, input is received from a second computer to specify or update one or more hyper-parameters of a trained machine learning model that is configured to perform time series forecasting. For example, the values for seasonality, trend, and collinearity can inform the modification of hyper-parameters of a forecasting model, and user computer 102 can provide updated hyper-parameters to configure the model.

At block 320, either after block 312 or block 310, the process can be programmed optionally to calculate forecasted event data using the aggregated time series data, trained machine learning model, and hyper-parameters. For example, a trained classifier coded in Python can be executed. At block 322, one or more visualizations of the forecasted event data and model performance can be displayed. Presentation instructions can be programmed, for example, to display a forecasted time series to specify what events, seasonality, trend, and collinearity are likely to be seen in the future, as well as model performance data with the hyper-parameters so that a user of the second computer can determine possible updates to the hyper-parameters, enter the updates, and evaluate the machine learning model again. At block 330, the process can be programmed to complete actions in the computer-implemented process 300.

2.3 Time Series Graphical User Interface Dashboard Examples

Embodiments can be programmed to generate and transmit, to a client computing device, presentation instructions that are programmed to cause rendering and displaying a plurality of different visualizations or dashboard displays in a graphical user interface. In one embodiment, a dashboard is divided into three (3) sections comprising a time series analysis dashboard, prefix forecast, and model performance summary. The time series analysis dashboard provides a plurality of graphical widgets that can be invoked to execute deep-dive time series analysis of the original behavior data and identify statistical patterns such as trend, seasonality, autocorrelation, hourly and weekly patterns, and outlier events. The prefix forecast is programmed to generate model forecast plots, including training data, validation data, actual versus predicted, and confidence interval plots. The model performance summary provides a model summary table, which includes model hyper-parameters, time of training, and performance KPIs such as rmse, mape, z_score, and std that can be used to evaluate errors and select the best model. The dashboard can integrate filter control widgets to invoke filters of the data by event_date column, or on a global basis for yearly, quarterly, monthly, weekly, or daily data.

Figure 4:
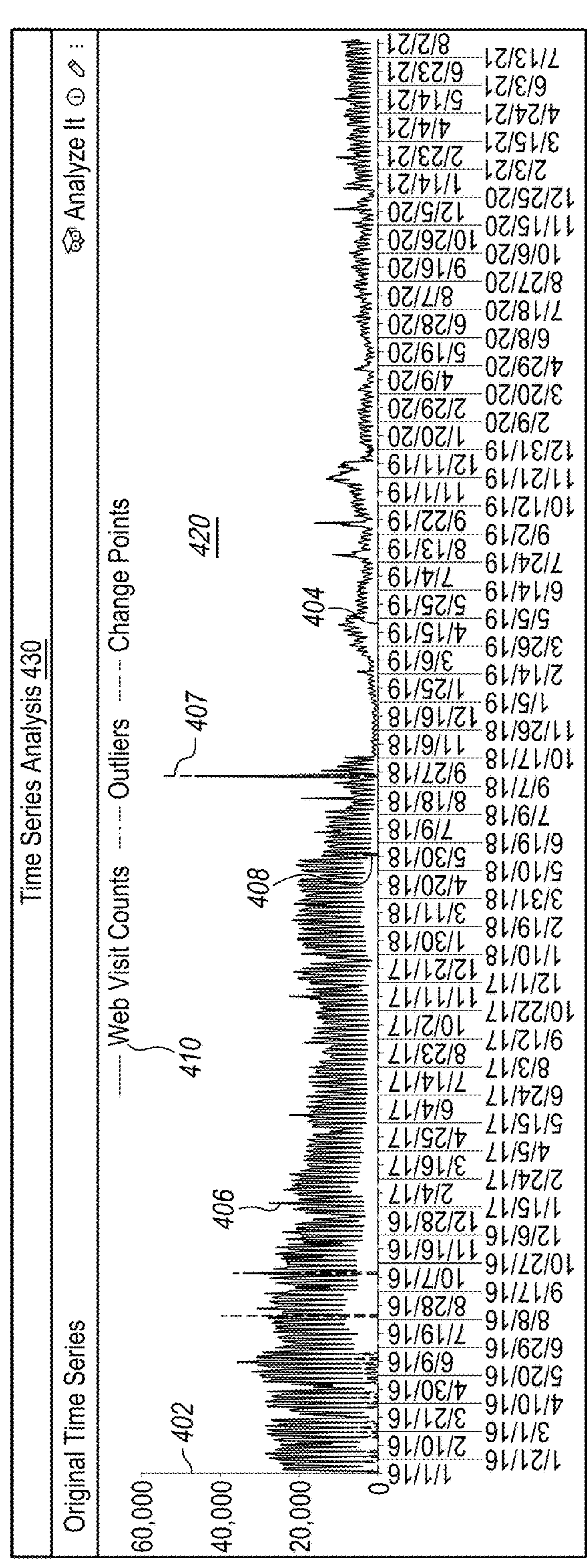
FIG. 4 illustrates an example computer display device with a graphical user interface showing visualizations of time series data.

FIG. 4 illustrates an example computer display device with a graphical user interface showing a general data overview of the time series data. For one example embodiment, FIG. 4 shows a computer display device that has rendered and displayed a graphical user interface (GUI) 400 arranged as a time series data overview. In an embodiment, TSAF instructions 150 are programmed to generate and display time series graph panel 430 using a graph window 420, a vertical or "Y" axis 402 having a linear scale from 0 to 60,000 web visit counts, a horizontal or "X" axis 404 representing days of the web visit counts, three graph lines 406, 407, and 408, and graph labels 410. In other embodiments, the units of the vertical axis 402 may be different, as FIG. 4 illustrates merely one example. Further, the units of the horizontal axis 404 may be days, periods of multiple weeks, months, years, or other periods. Graph line 406 is calculated and displayed to show the aggregated event data values and the corresponding aggregated timestamps; Graph line 407 is calculated and displayed to show the outlier values and the corresponding aggregated timestamps; Graph line 408 is calculated and displayed to show the change point values and the corresponding aggregated timestamps. In an embodiment, one or more graph lines may be displayed in the graph window 420, each of the lines corresponding to a label shown as one of the graph labels 410. In another embodiment, graph window 420 can include labels 410 specifying event data, outliers, and change points, each of the labels having a different color or other distinctive visual presentation, and each of the graph lines in the line chart can be displayed in a color or other distinctive visual presentation matching one of the labels.

Figure 5A:
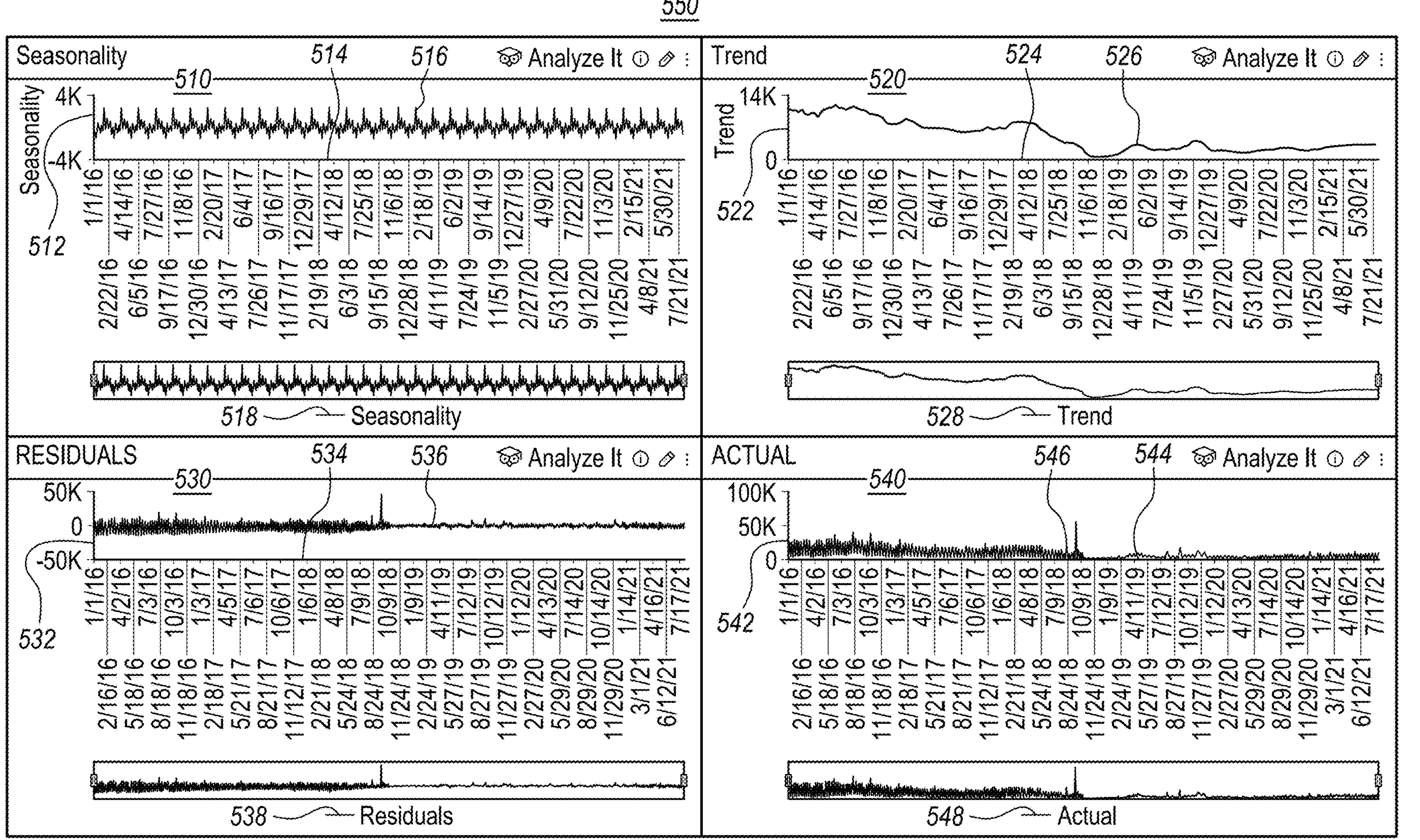
FIG. 5A and FIG. 5B illustrate an example computer display device, each view showing a portion of a graphical user interface showing visualizations of time series analysis results.
Figure 5B:
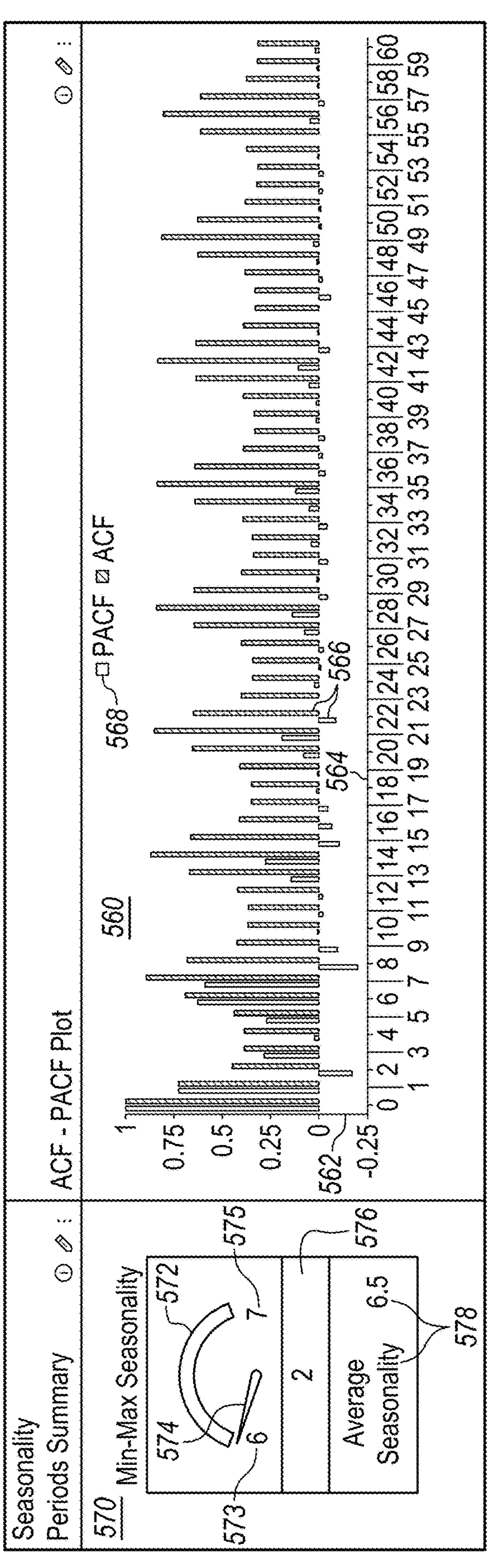

FIG. 5A and FIG. 5B illustrate an example computer display device with a graphical user interface showing visualizations of time series analysis results. Referring first to FIG. 5A, in an embodiment, the TSAF instructions 150 are programmed to generate presentation instructions which when rendered using a computer display device cause rendering a graphical user interface 500 to generate and display time series analysis results panel 550 using a graph window 510, a vertical or "Y" axis 512 having a linear scale from −4,000 to 4,000, a horizontal or "X" axis 514 representing days of the event data, a graph line 516, and a graph label 518. Graph line 516 is calculated and displayed to show the seasonality analysis results and the corresponding aggregated timestamps. In another embodiment, time series analysis results panel 550 can include a graph window 520, a vertical or "Y" axis 522 having a linear scale from 0 to 24,000, a horizontal or "X" axis 524 representing days of the event data, a graph line 526, and a graph label 528. Graph line 526 is calculated and displayed to show the trend analysis results and the corresponding aggregated timestamps. In another embodiment, time series analysis results panel 550 can include a graph window 530, a vertical or "Y" axis 532 having a linear scale from −50,000 to 50,000, a horizontal or "X" axis 534 representing days of the event data, a graph line 536, and a graph label 538. Graph line 536 is calculated and displayed to show the residuals data and the corresponding aggregated timestamps. In another embodiment, time series analysis results panel 550 can include a graph window 540, a vertical or "Y" axis 542 having a linear scale from 0 to 100,000, a horizontal or "X" axis 544 representing days of the event data, a graph line 546, and a graph label 548. Graph line 546 is calculated and displayed to show the actual data and the corresponding aggregated timestamps. In an embodiment, one or more graph lines may be displayed in the graph windows 510, 520, 530, and 540, each of the lines corresponding to a label shown as one of the graph labels. In other embodiments, the units of the vertical axis 512, 522, 532, and 542 may be different, as FIG. 5A illustrates merely one example. Further, the units of the horizontal axis 514, 524, 534, and 544 may be days, periods of multiple weeks, months, years, or other periods.

Referring now to FIG. 5B, in an embodiment, TSAF instructions 150 can be programmed to generate and cause displaying the autocorrelation-partial autocorrelation plot 560 as a bar graph having a vertical or "Y" axis 562 that specifies the relative values of the autocorrelation and partial autocorrelation factors with a linear scale from −0.25 to 1, and a horizontal or "X" axis 564 that identifies lags. In this context, lags can be periods behind in time for the corresponding autocorrelation and partial autocorrelation factors. For example, a time series (y) with a "k"th lag is its version that is "t-k" periods behind in time. A time series with lag (k=1) is a version of the original time series that is 1 period behind in time, i.e. y (t−1). More generally, a lag k autocorrelation is the correlation between values that are k time periods a part. With annual data, the number of lags is typically small, 1 or 2 lags in order not to lose degrees of freedom. With quarterly data, 1 to 8 lags is appropriate, and for monthly data, 6, 12 or 24 lags can be used given sufficient data points. Autocorrelation can be used to identify patterns within the time series, which helps in determining seasonality, the tendency for patterns to repeat at periodic frequencies.

In one embodiment, the graphical bars 566 represent the autocorrelation and partial autocorrelation factors, with one bar representing an autocorrelation factor and one bar representing a partial autocorrelation factor and both bars corresponding to one lag number. In one embodiment, autocorrelation-partial autocorrelation plot 560 can include labels 568 specifying autocorrelation factor and partial autocorrelation factor, each of the labels having a different color or other distinctive visual presentation, and each of the bars in the bar graph can be displayed in a color or other distinctive visual presentation matching one of the labels.

In an embodiment, TSAF instructions 150 can be programmed to generate and cause displaying a range label widget 570 having one or more arc segments 572, a minimum seasonality value label 573, a pointer 574, a maximum seasonality value label 575, a box item displaying the number of seasonality values 576, and a box item displaying the average seasonality value 578. The pointer 574 can be used to indicate the preferred seasonality value based on the autocorrelation-partial autocorrelation plot 560. In other embodiments, the arc segment may display additional seasonality values, as FIG. 5B illustrates merely one example.

In some embodiments, the KATS library from FACEBOOK can be used for seasonality detection. KATS implements an ACFDetector and FFTDetector for seasonality detection. The ACFDetector (Autocorrelation function seasonality detector) uses an ACF to detect seasonality and determine potential cycle lengths. The FFTDetector (Fast Fourier Transform Seasonality detector) uses a Fast Fourier Transform to detect seasonality and determine potential cycle length. In some embodiments, the seasonality value can be set after examining the ACF plot from the dashboard and can choose a seasonality value of a higher magnitude. In some embodiments, an optimal seasonality value is chosen and input by the data scientist who uses the model by starting with a highest seasonality value and comparing model performance to lower seasonality, then choosing a seasonality metric that minimizes the forecasting error.

Figure 6:
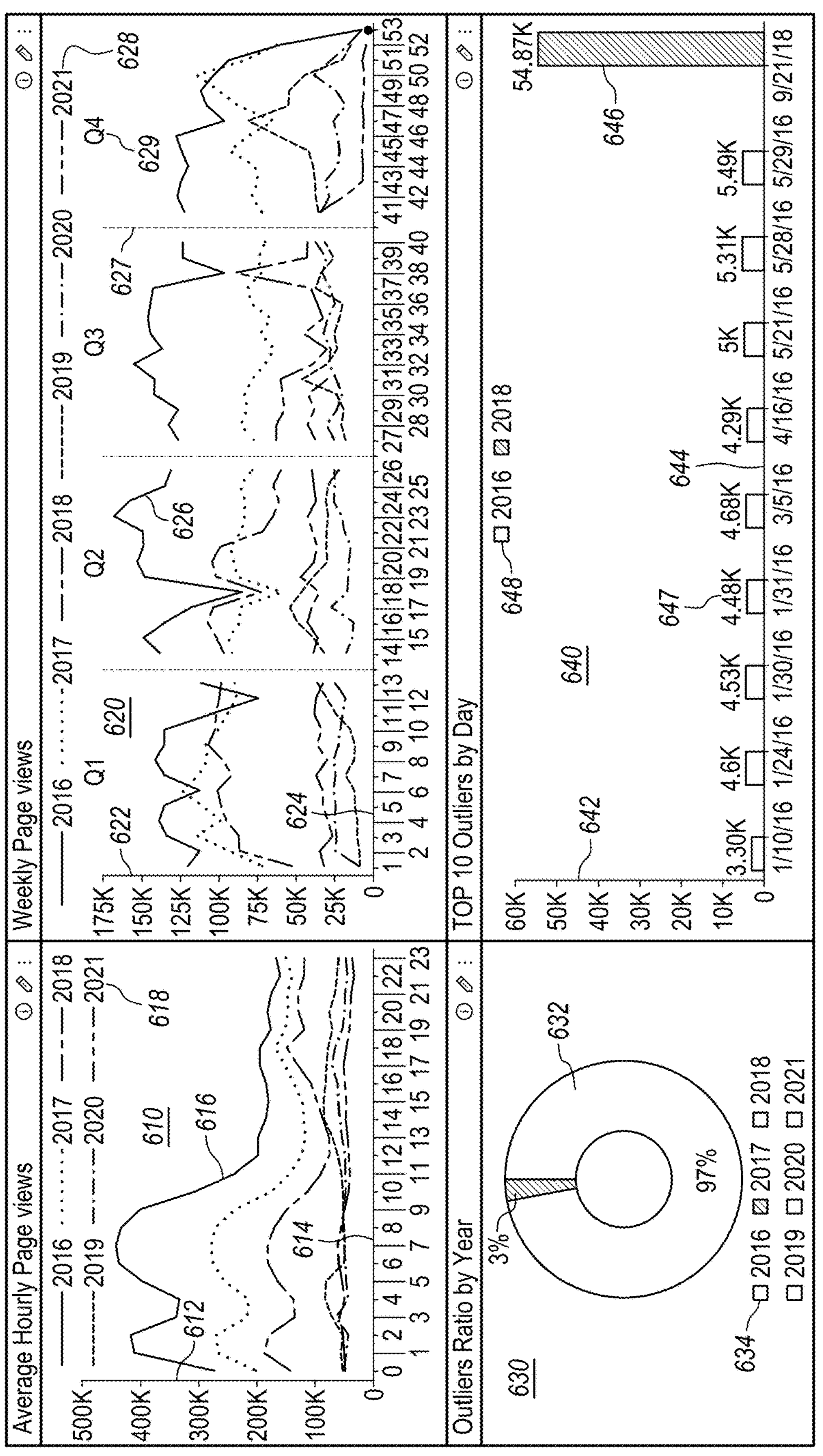
FIG. 6 illustrates an example computer display device with a graphical user interface showing visualizations of outlier analysis results.

FIG. 6 illustrates an example computer display device, each view showing a portion of a graphical user interface showing visualizations of outlier analysis results. In an embodiment, the TSAF instructions 150 are programmed to generate and display hourly data patterns using a graph window 610, a vertical or "Y" axis 612 having a linear scale from 0 to 500,000 average page view counts, a horizontal or "X" axis 614 representing the hours of a day, a graph line 616, and graph labels 618. In other embodiments, the units of the vertical axis 612 may be different, as FIG. 6 illustrates merely one example. Graph line 616 is calculated and displayed to show the average hourly event data values in a year and the corresponding hour. In an embodiment, one or more graph lines may be displayed in the graph window 610, each of the lines corresponding to a label shown as one of the graph labels 618. In another embodiment, graph window 610 can include labels 618 specifying different years, each of the labels having a different color or other distinctive visual presentation, and each of the graph lines in the line chart can be displayed in a color or other distinctive visual presentation matching one of the labels.

In an embodiment, the TSAF instructions 150 are programmed to generate and display weekly data patterns using a graph window 620, a vertical or "Y" axis 622 having a linear scale from 0 to 175,000 average page view counts, a horizontal or "X" axis 624 representing the weeks of a year, a graph line 626, four vertical lines 627, graph labels 628, and quarter labels 629. In an embodiment, the graph window 620 is divided evenly by the vertical lines 627, with each divided section representing a quarter of a year labeled by the quarter labels 629. In other embodiments, the units of the vertical axis 622 may be different, as FIG. 6 illustrates merely one example. Graph line 626 is calculated and displayed to show the average weekly event data values in a year and the corresponding week. In an embodiment, one or more graph lines may be displayed in the graph window 620, each of the lines corresponding to a label shown as one of the graph labels 628. In another embodiment, graph window 620 can include labels 628 specifying different years, each of the labels having a different color or other distinctive visual presentation, and each of the graph lines in the line chart can be displayed in a color or other distinctive visual presentation matching one of the labels.

In an embodiment, the TSAF instructions 150 can be programmed to generate and cause displaying a circle widget 630 having one or more arc segments 632 and year labels 634. The year labels 634 can be displayed using different colors or other forms of distinctive visual appearance. The arcuate length of each arc segment 632 can be proportional to a percentage of the number of outliers in a corresponding year, as compared to all the number of outliers. To provide a visual cue concerning the proportions, each arc segment 632 can be displayed using a color or other form of distinctive visual appearance that matches a color or other form of distinctive visual appearance of one of the data type labels 634.

In an embodiment, TSAF instructions 150 can be programmed to generate and cause displaying the top K outliers as a bar graph 640 having a vertical or "Y" axis 642 that specifies the value of the outliers with a linear scale from 0 to 60,000, and a horizontal or "X" axis 644 that identifies the days of the outliers. In one embodiment, the graphical bars 646 represent the outliers labeled by their corresponding values 647. In one embodiment, the bar graph 640 can include labels 648 specifying the years of the outliers, each of the labels having a different color or other distinctive visual presentation, and each of the bars in the bar graph can be displayed in a color or other distinctive visual presentation matching one of the labels.

Referring again to FIG. 3, a computer-implemented process 300 has been described to execute time series analysis functions via block 302 through block 310 inclusive. At block 320, the computer-implemented process 300 can optionally be programmed to execute time series forecasting functions to calculate forecasted event data. In one embodiment, execution of block 320 can comprise invoking ARIMA, Sarima, Exponential Smoothening, and fbProphet linear and/or other non-linear machine learning models to perform the time series forecasting, such that output of the machine learning models provides predicted event data and a confidence level value.

At block 322, the process is programmed to generate display instructions that are configured for rendering, in a display device that supports a graphical user interface, the results of time series forecasting.

Figure 7A:
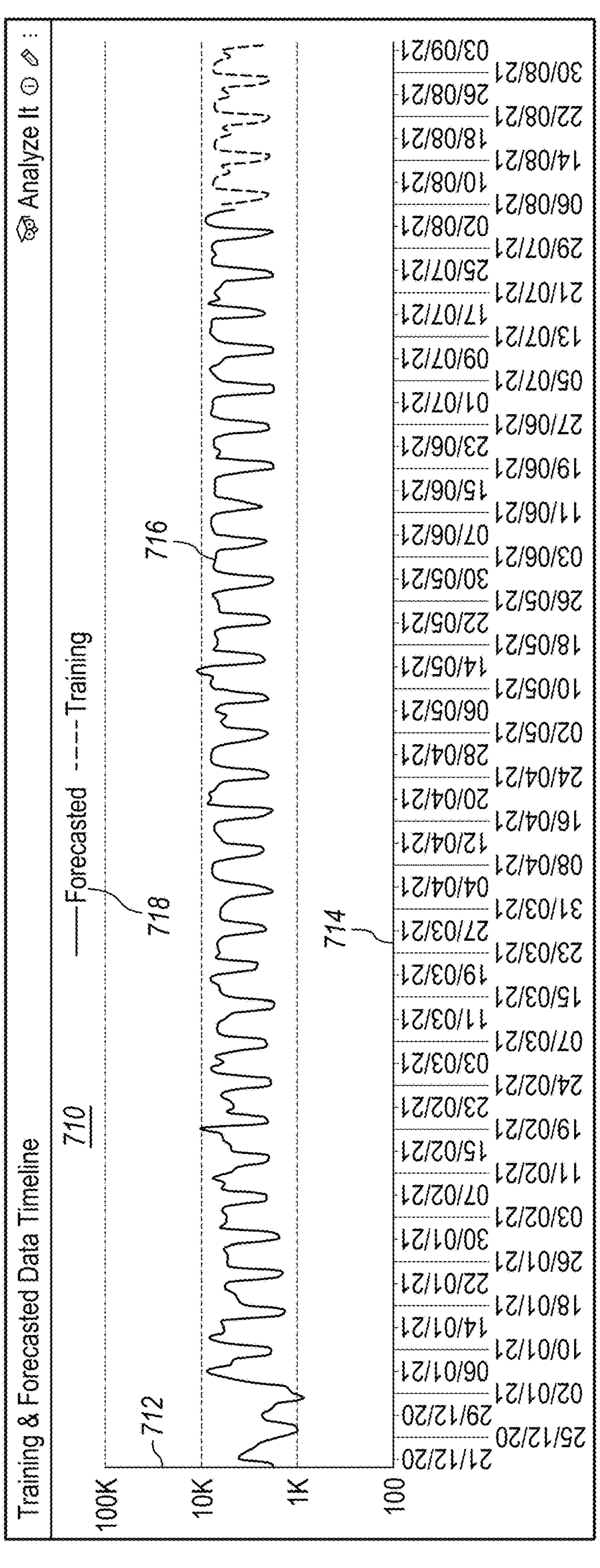
FIG. 7A and FIG. 7B illustrate an example computer display device, each view showing a portion of a graphical user interface showing visualizations of time series forecasting results.
Figure 7B:
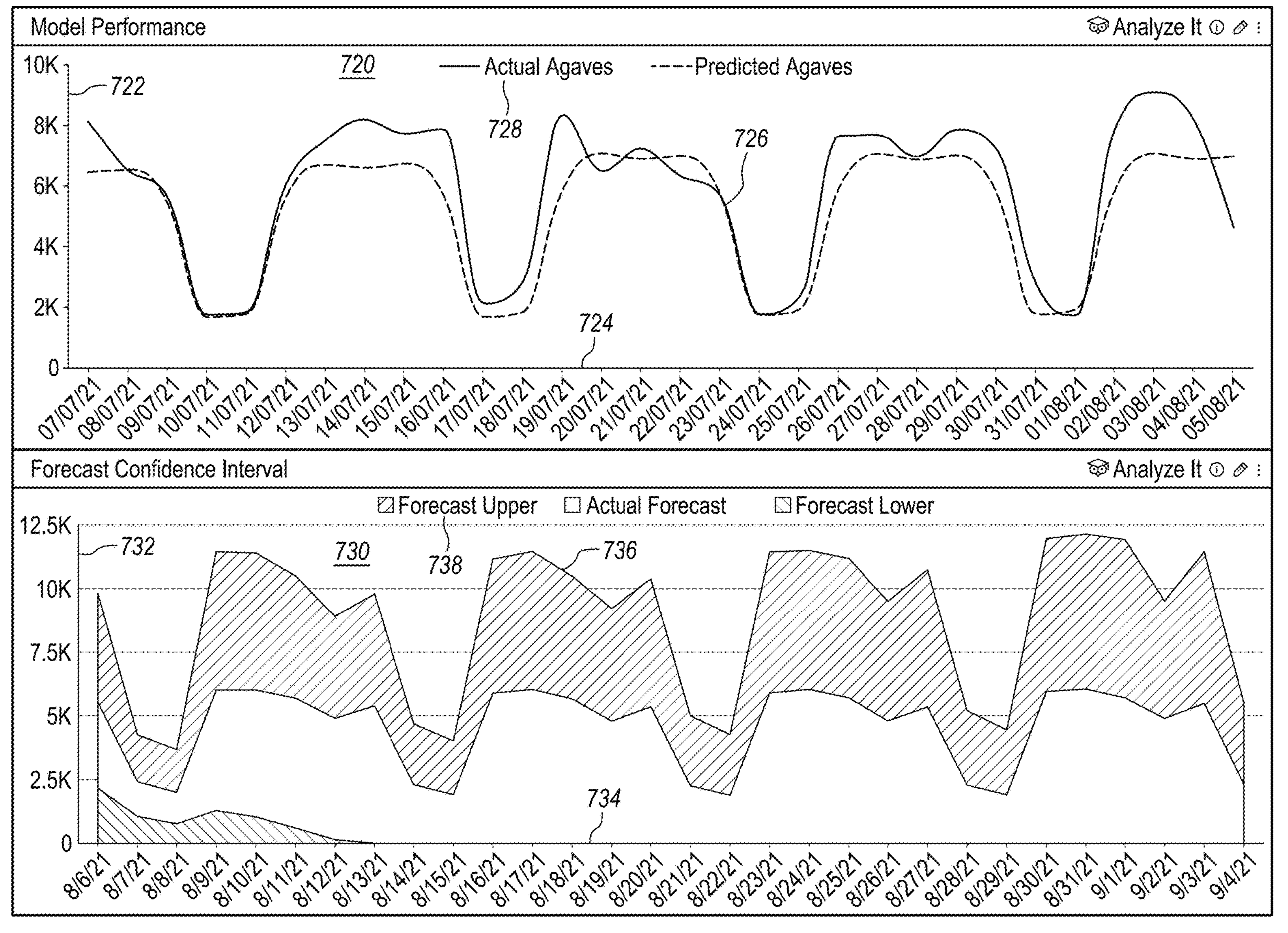

FIG. 7A and FIG. 7B illustrate an example computer display device with a graphical user interface showing visualizations of time series forecasting results.

Referring to FIG. 7A, in an embodiment, TSAF instructions 150 are programmed to generate instructions which when rendered cause displaying, on a computer display device, the TSAF instructions 150 are programmed to generate and display the training data and forecasted data using a graph window 710, a vertical or "Y" axis 712 having a logarithmic scale from 100 to 100,000, a horizontal or "X" axis 714 representing timestamps of the event data, a graph line 716, and graph labels 718. In other embodiments, the units of the vertical axis 712 may be different, as FIG. 7A illustrates merely one example. In an embodiment, one or more graph lines may be displayed in the graph window 710, each of the lines corresponding to a label shown as one of the graph labels 718. In another embodiment, graph window 710 can include labels 718 specifying training data and forecasted data, each of the labels having a different color or other distinctive visual presentation, and each of the graph lines in the line chart can be displayed in a color or other distinctive visual presentation matching one of the labels. In other embodiments, the graph line 716 can be divided into two separate lines, with one line representing the actual event data used for training purposes, the other line representing the forecasted event data.

Referring now to FIG. 7B, in an embodiment, TSAF instructions 150 are programmed to generate instructions which when rendered cause displaying, on a computer display device, the TSAF instructions 150 are programmed to generate and display the model performance data using a graph window 720, a vertical or "Y" axis 722 having a linear scale from 0 to 10,000 representing page view counts, a horizontal or "X" axis 724 representing timestamps of the event data, a graph line 726, and graph labels 728. In other embodiments, the units of the vertical axis 722 may be different, as FIG. 7B illustrates merely one example. In an embodiment, one or more graph lines may be displayed in the graph window 720, each of the lines corresponding to a label shown as one of the graph labels 728. In another embodiment, graph window 720 can include labels 728 specifying actual page views and forecasted page views, each of the labels having a different color or other distinctive visual presentation, and each of the graph lines in the line chart can be displayed in a color or other distinctive visual presentation matching one of the labels. In other embodiments, two graph lines are displayed in the graph window 720, with one line representing the actual event data with timestamps, the other line representing the forecasted event data with the same timestamps to evaluate the time series forecasting model performance.

In an embodiment, TSAF instructions 150 are programmed to generate instructions which when rendered cause displaying, on a computer display device, the TSAF instructions 150 are programmed to generate and display the forecasted event data using a graph window 730, a vertical or "Y" axis 732 having a linear scale from 0 to 10,000, a horizontal or "X" axis 734 representing timestamps of the event data, an area 736, and graph labels 738. In other embodiments, the units of the vertical axis 732 may be different, as FIG. 7 illustrates merely one example. In an embodiment, one or more areas may be displayed in the graph window 730, each of the areas corresponding to a label shown as one of the graph labels 728. In another embodiment, graph window 720 can include labels 728 specifying forecasted data, forecasted data with upper confidence intervals, and forecasted data with lower confidence intervals, each of the labels having a different color or other distinctive visual presentation, and each of the areas in the line chart can be displayed in a color or other distinctive visual presentation matching one of the labels.

FIG. 8 illustrates an example computer display device with a graphical user interface showing visualizations of time series forecasting model performance summary table. In an embodiment, the table 810 comprises a table header row 820 having a plurality of column labels 830, each of the column labels naming and corresponding to a specific calculation that the TSAF instructions 150 are programmed to calculate or a parameter provided by the configuration file. Each row of rows 840 identifies a performed forecasting session by its session ID, which appears in the first column label 835. In the example of FIG. 8, column labels 830 identify parameters and calculation results, including hyperparameters and performance KPIs such as root mean square deviation ("RMSE"), RMSE standard deviation ratio, and RMSE z-score.

2.3 Benefits and Improvements

The embodiments of this disclosure offer numerous benefits and improvements over prior approaches. The techniques of this disclosure are highly scalable as compared to custom scripting or other manual programming techniques. Operation of the workflow is easy to parametrize and customize using different parameters in the configuration file. Embodiments of the dashboard and other GUI elements can be made easily accessible within a larger CDP platform; in this arrangement, there will be no need for a Python environment and running heavy Pandas functions. Embodiments can be used by data engineers and business analysts to analyze time series data and discover patterns that can be used to better forecast future activity and plan marketing campaigns or seasonal promotions.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 9:
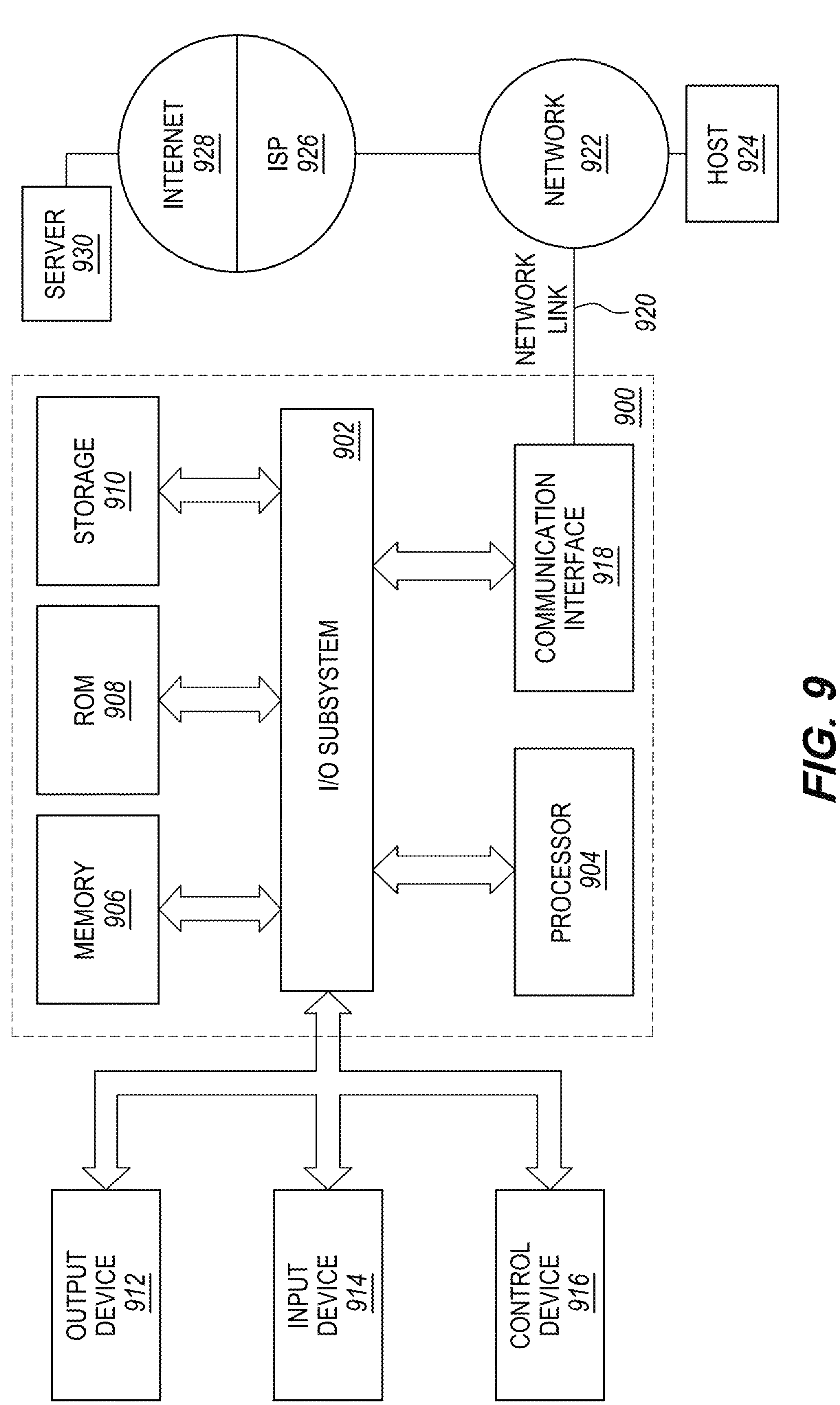
FIG. 9 illustrates a computer system with which one embodiment could be implemented.

FIG. 9 is a block diagram that illustrates an example computer system with which an embodiment may be implemented. In the example of FIG. 9, a computer system 900 and instructions for implementing the disclosed technologies in hardware, software, or a combination of hardware and software, are represented schematically, for example, as boxes and circles, at the same level of detail that is commonly used by persons of ordinary skill in the art to which this disclosure pertains for communicating about computer architecture and computer systems implementations.

Computer system 900 includes an input/output (I/O) subsystem 902, which may include a bus and/or other communication mechanism(s) for communicating information and/or instructions between the components of the computer system 900 over electronic signal paths. The I/O subsystem 902 may include an I/O controller, a memory controller, and at least one I/O port. The electronic signal paths are represented schematically in the drawings, for example as lines, unidirectional arrows, or bidirectional arrows.

At least one hardware processor 904 is coupled to I/O subsystem 902 for processing information and instructions. Hardware processor 904 may include, for example, a general-purpose microprocessor or microcontroller and/or a special-purpose microprocessor such as an embedded system, a graphics processing unit (GPU), or a digital signal processor or ARM processor. Processor 904 may comprise an integrated arithmetic logic unit (ALU) or may be coupled to a separate ALU.

Computer system 900 includes one or more units of memory 906, such as a main memory, which is coupled to I/O subsystem 902 for electronically digitally storing data and instructions to be executed by processor 904. Memory 906 may include volatile memory such as various forms of random-access memory (RAM) or other dynamic storage device. Memory 906 may also be used for storing temporary variables or other intermediate information during the execution of instructions to be executed by processor 904. Such instructions, when stored in non-transitory computer-readable storage media accessible to processor 904, can render computer system 900 into a special-purpose machine that is customized to perform the operations specified in the instructions.

Computer system 900 further includes non-volatile memory such as read-only memory (ROM) 908 or other static storage devices coupled to I/O subsystem 902 for storing information and instructions for processor 904. The ROM 908 may include various forms of programmable ROM (PROM), such as erasable PROM (EPROM) or electrically erasable PROM (EEPROM). A unit of persistent storage 910 may include various forms of non-volatile RAM (NVRAM), such as FLASH memory, solid-state storage, magnetic disk, or optical disks such as CD-ROM or DVD-ROM and may be coupled to I/O subsystem 902 for storing information and instructions. Storage 910 is an example of a non-transitory computer-readable medium that may be used to store instructions and data, which, when executed by processor 904, causes performing computer-implemented methods to execute the techniques herein.

The instructions in memory 906, ROM 908, or storage 910 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer, such as a relational database system using structured query language (SQL) or no SQL, an object store, a graph database, a flat file system, or other data storage.

Computer system 900 may be coupled via I/O subsystem 902 to at least one output device 912. In one embodiment, output device 912 is a digital computer display. Examples of a display that may be used in various embodiments include a touchscreen display, a light-emitting diode (LED) display, a liquid crystal display (LCD), or an e-paper display. Computer system 900 may include other types(s) of output devices 912, alternatively or in addition to a display device. Examples of other output devices 912 include printers, ticket printers, plotters, projectors, sound cards or video cards, speakers, buzzers or piezoelectric devices or other audible devices, lamps or LED or LCD indicators, haptic devices, actuators or servos.

At least one input device 914 is coupled to I/O subsystem 902 for communicating signals, data, command selections, or gestures to processor 904. Examples of input devices 914 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 916, which may perform cursor control or other automated control functions such as navigation in a graphical interface on a display screen, alternatively or in addition to input functions. Control device 916 may be a touchpad, a mouse, a trackball, or cursor direction keys for communicating direction information and command selections to processor 904 and for controlling cursor movement on display 912. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other type of control device. An input device 914 may include a combination of multiple different input devices, such as a video camera and a depth sensor.

In another embodiment, computer system 900 may comprise an Internet of Things (IoT) device in which one or more of the output device 912, input device 914, and control device 916 are omitted. Or, in such an embodiment, the input device 914 may comprise one or more cameras, motion detectors, thermometers, microphones, seismic detectors, other sensors or detectors, measurement devices or encoders, and the output device 912 may comprise a special-purpose display such as a single-line LED or LCD display, one or more indicators, a display panel, a meter, a valve, a solenoid, an actuator or a servo.

When computer system 900 is a mobile computing device, input device 914 may comprise a global positioning system (GPS) receiver coupled to a GPS module that is capable of triangulating to a plurality of GPS satellites, determining and generating geo-location or position data such as latitude-longitude values for a geophysical location of the computer system 900. Output device 912 may include hardware, software, firmware, and interfaces for generating position reporting packets, notifications, pulse or heartbeat signals, or other recurring data transmissions that specify a position of the computer system 900, alone or in combination with other application-specific data, directed toward host 924 or server 930.

Computer system 900 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 900 in response to processor 904 executing at least one sequence of at least one instruction contained in main memory 906. Such instructions may be read into main memory 906 from another storage medium, such as storage 910. Execution of the sequences of instructions contained in main memory 906 causes processor 904 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 910. Volatile media includes dynamic memory, such as memory 906. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 902. Transmission media can also take the form of acoustic or light waves, such as those generated during radio-wave and infrared data communications.

Various forms of media may be involved in carrying at least one sequence of at least one instruction to processor 904 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 900 can receive the data on the communication link and convert the data to a format that can be read by computer system 900. For instance, a receiver such as a radio frequency antenna or an infrared detector can receive the data carried in a wireless or optical signal, and appropriate circuitry can provide the data to I/O subsystem 902, such as placing the data on a bus. I/O subsystem 902 carries the data to memory 906, from which processor 904 retrieves and executes the instructions. The instructions received by memory 906 may optionally be stored on storage 910 either before or after execution by processor 904.

Computer system 900 also includes a communication interface 918 coupled to a bus of I/O subsystem 902. Communication interface 918 provides a two-way data communication coupling to network link(s) 920 that are directly or indirectly connected to at least one communication network, such as a network 922 or a public or private cloud on the Internet. For example, communication interface 918 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 922 broadly represents a local area network (LAN), wide-area network (WAN), campus network, internetwork, or any combination thereof. Communication interface 918 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 918 sends and receives electrical, electromagnetic, or optical signals over signal paths that carry digital data streams representing various types of information.

Network link 920 typically provides electrical, electromagnetic, or optical data communication directly or through at least one network to other data devices, using, for example, satellite, cellular, Wi-Fi, or BLUETOOTH technology. For example, network link 920 may provide a connection through network 922 to a host computer 924.

Furthermore, network link 920 may provide a connection through network 922 or to other computing devices via internetworking devices and/or computers that are operated by an Internet Service Provider (ISP) 826. ISP 826 provides data communication services through a worldwide packet data communication network represented as Internet 928. A server computer 930 may be coupled to Internet 928. Server 930 broadly represents any computer, data center, virtual machine, or virtual computing instance with or without a hypervisor or computer executing a containerized program system such as DOCKER or KUBERNETES. Server 930 may represent an electronic digital service that is implemented using more than one computer or instance, and that is accessed and used by transmitting web services requests, uniform resource locator (URL) strings with parameters in HTTP payloads, API calls, app services calls, or other service calls. Computer system 900 and server 930 may form elements of a distributed computing system that includes other computers, a processing cluster, a server farm, or other organization of computers that cooperate to perform tasks or execute applications or services. Server 930 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 930 may comprise a web application server that hosts a presentation layer, application layer, and data storage layer such as a relational database system using structured query language (SQL) or no SQL, an object store, a graph database, a flat file system, or other data storage.

Computer system 900 can send messages and receive data and instructions, including program code, through the network(s), network link 920, and communication interface 918. In the Internet example, server 930 might transmit a requested code for an application program through Internet 928, ISP 926, local network 922, and communication interface 918. The received code may be executed by processor 904 as it is received and/or stored in storage 910 or other non-volatile storage for later execution.

The execution of instructions, as described in this section, may implement a process in the form of an instance of a computer program that is being executed, consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 904. While each processor 904 or core of the processor executes a single task at a time, computer system 900 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims issued from this application in the specific form in which such claims issue, including any subsequent correction.

What is claimed is:

1. A computer-implemented method, comprising:

using a first computer, establishing programmatic connections to a digitally stored first database comprising over one million records, each of the records comprising time series data organized as an event with a timestamp and an event data, the first database being a multi-tenant data store programmatically coupled to a data warehouse manager and a query engine;

using the first computer, reading a configuration file that specifies one or more tables in the first database;

successively reading each particular table that is identified in the configuration file;

for each particular table among the one or more tables, forming and submitting a plurality of queries to the first database, each of the queries specifying one or more data aggregation operations, and in response to the plurality of queries, receiving a set of aggregated records of the first database and creating and storing reduced-size tables based on the aggregated records;

training a machine learning model using a portion of the set of the aggregated records as a training dataset;

using the first computer, determining a plurality of hyper-parameters for a machine learning model, the plurality of hyper-parameters including a plurality of outlier values that are represented in the set of aggregated records, one or more change points that are represented in the set of aggregated records, a plurality of seasonality patterns that are represented in the set of aggregated records;

using the machine learning model with the hyper-parameters, evaluating the aggregated records of the first database using the machine learning model to output forecasted event data as a second time series; and generating presentation instructions using a computer display device configured to display one or more graphical visualizations in a graphical user interface of the computer display device, the graphical visualizations comprising a time series analysis and a graphical timeline of a forecasted time series that specifies a set of events, seasonality, trend, or collinearity are likely to be seen in the future;

using the first computer receiving, from a second computer, input specifying the plurality of hyper-parameters for the machine learning model, wherein the plurality of hyper-parameters have been modified using the seasonality, trend, or collinearity and updating the machine learning model using the plurality of hyper-parameters;

using the machine learning model with the hyper-parameters after the updating, evaluating the aggregated records of the first database using the machine learning model to output forecasted event data as a third time series;

generating presentation instructions using a computer display device configured to display one or more graphical visualizations in a graphical user interface of the computer display device, the graphical visualizations comprising the time series analysis and a graphical timeline of the third time series.

2. The method of claim 1, wherein the configuration file specifies an input database and tables, output tables, data pre-processing and aggregation parameters, custom data filter parameters, Python code global parameters, and ensemble model parameters in different sections.

3. The method of claim 1, wherein the configuration file includes a plurality of instructions and parameters that control a flow of execution of a time series analysis and forecasting (TSAF) instructions.

4. The method of claim 3, wherein the TSAF instructions are programmed to use PRESTO and HIVE functions and operations that can loop through a list of database tables in multi-tenant data store, extract or calculate time series analysis and forecasted event data from each table, and use aggregation to generated aggregated tables.

5. The method of claim 1, further comprising:

training the machine learning model using an ensemble of machine learning models for time series to forecast future activity, the ensemble of machine learning models include an Autoregressive Integrated Moving Average (ARIMA) model, a seasonal ARIMA (SARIMA)

model, an exponential smoothing model, a fbProphet linear model, and one or more non-linear models.

6. The method of claim 1, further comprising: the presentation instructions being programmed, when rendered using the computer display device configured to display the one or more graphical visualizations in the graphical user interface of the computer display device, a time series plot comprising a line chart comprising one or more graph lines graphing one or more event data values, outlier values, and change point values against their corresponding timestamp data.

7. The method of claim 1, further comprising: the presentation instructions being programmed, when rendered using the computer display device configured to display in the one or more graphical visualizations in the graphical user interface of the computer display device, an autocorrelation-partial autocorrelation bar chart comprising graphical bars representing autocorrelation and partial autocorrelation factors, each of the bars corresponding to one lag, each of the bars having a height that is proportional to a magnitude of value of the autocorrelation or partial autocorrelation factors, each of the bars representing partial a positive or negative autocorrelation factor.

8. The method of claim 1, further comprising: the presentation instructions being programmed, when rendered using the computer display device configured to display in the one or more graphical visualizations in the graphical user interface of the computer display device, one or more line charts comprising one or more graph lines graphing seasonality values, trend values, residual values, and actual values against their corresponding timestamp data.

9. The method of claim 1, further comprising: the presentation instructions being programmed, when rendered using the computer display device configured to display in the one or more graphical visualizations in the graphical user interface of the computer display device, a range label widget comprising a graphical arm displaying a number of seasonality values, a box item corresponding to the number of seasonality values, and a box item corresponding to an average seasonality value.

10. The method of claim 1, further comprising: the presentation instructions being programmed, when rendered using the computer display device configured to display in the one or more graphical visualizations in the graphical user interface of the computer display device, one or more line charts comprising one or more graph lines corresponding to one or more years of aggregated event data, graphing the aggregated event data values against a period of time.

11. One or more non-transitory computer-readable storage media storing one or more sequences of program instructions which, when executed using one or more processors, cause the one or more processors to execute:

using a first computer, establishing programmatic connections to a digitally stored first database comprising over one million records, each of the records comprising time series data organized as an event with a timestamp and an event data, the first database being a multi-tenant data store programmatically coupled to a data warehouse manager and a query engine;

using the first computer, reading a configuration file that specifies one or more tables in the first database;

successively reading each particular table that is identified in the configuration file;

for each particular table among the one or more tables, forming and submitting a plurality of queries to the first database, each of the queries specifying one or more data aggregation operations, and in response to the plurality of queries, receiving a set of aggregated records of the first database and creating and storing reduced-size tables based on the aggregated records;

training a machine learning model using a portion of the set of the aggregated records as a training dataset;

using the first computer, determining a plurality of hyper-parameters for a machine learning model, the plurality of hyper-parameters including a plurality of outlier values that are represented in the set of aggregated records, one or more change points that are represented in the set of aggregated records, a plurality of seasonality patterns that are represented in the set of aggregated records;

using the machine learning model with the hyper-parameters, evaluating the aggregated records of the first database using the machine learning model to output forecasted event data as a second time series; and generating presentation instructions using a computer display device configured to display one or more graphical visualizations in a graphical user interface of the computer display device, the graphical visualizations comprising a time series analysis and a graphical timeline of a forecasted time series that specifies a set of events, seasonality, trend, or a collinearity are likely to be seen in the future;

using the first computer receiving, from a second computer, input specifying the plurality of hyper-parameters for the machine learning model, wherein the plurality of hyper-parameters have been modified using the seasonality, trend, or collinearity and updating the machine learning model using the plurality of hyper-parameters;

using the machine learning model with the hyper-parameters after the updating, evaluating the aggregated records of the first database using the machine learning model to output forecasted event data as a third time series;

generating presentation instructions using a computer display device configured to display one or more graphical visualizations in a graphical user interface of the computer display device, the graphical visualizations comprising the time series analysis and a graphical timeline of the third time series.

12. The storage media of claim 11, wherein the configuration file specifies an input database and tables, output tables, data pre-processing and aggregation parameters, custom data filter parameters, Python code global parameters, and ensemble model parameters in different sections.

13. The storage media of claim 11, wherein the configuration file includes a plurality of instructions and parameters that control a flow of execution of a time series analysis and forecasting (TSAF) instructions.

14. The storage media of claim 13, wherein the TSAF instructions are programmed to use PRESTO and HIVE functions and operations that can loop through a list of database tables in multi-tenant data store, extract or calculate time series analysis and forecasted event data from each table, and use aggregation to generated aggregated tables.

15. The storage media of claim 11, further comprising sequences of program instructions which, when executed using the one or more processors, cause the one or more processors to execute:

training the machine learning model using an ensemble of machine learning models for time series to forecast future activity, the ensemble of machine learning models include an Autoregressive Integrated Moving Average (ARIMA) model, a seasonal ARIMA (SARIMA)

model, an exponential smoothing model, a fbProphet linear model, and one or more non-linear models.

16. The storage media of claim 11, further comprising sequences of program instructions which, when executed using the one or more processors, cause the one or more processors to execute: generating the presentation instructions, that when rendered using the computer display device configured to display, in the one or more graphical visualizations in the graphical user interface of the computer display device, a time series plot comprising a line chart comprising one or more graph lines graphing one or more event data values, outlier values, and change point values against their corresponding timestamp data.

17. The storage media of claim 11, further comprising sequences of program instructions which, when executed using the one or more processors, cause the one or more processors to generating the presentation instructions, that when rendered using the computer display device configured to display, in the one or more graphical visualizations in the graphical user interface of the computer display device, an autocorrelation-partial autocorrelation bar chart comprising graphical bars representing autocorrelation and partial autocorrelation factors, each of the bars corresponding to one lag, each of the bars having a height that is proportional to a magnitude of value of the autocorrelation or partial autocorrelation factors, each of the bars representing partial a positive or negative autocorrelation factor.

18. The storage media of claim 11, further comprising sequences of program instructions which, when executed using the one or more processors, cause the one or more processors to execute: generating the presentation instructions, that when rendered using the computer display device configured to display, in the one or more graphical visualizations in the graphical user interface of the computer display device, one or more line charts comprising one or more graph lines graphing seasonality values, trend values, residual values, and actual values against their corresponding timestamp data.

19. The storage media of claim 11, further comprising sequences of program instructions which, when executed using the one or more processors, cause the one or more processors to execute: generating the presentation instructions, that when rendered using the computer display device configured to display, in the one or more graphical visualizations in the graphical user interface of the computer display device, a range label widget comprising a graphical arm displaying a number of seasonality values, a box item corresponding to the number of seasonality values, and a box item corresponding to an average seasonality value.

20. The storage media of claim 11, further comprising sequences of program instructions which, when executed using the one or more processors, cause the one or more processors to execute: generating the presentation instructions, that when rendered using the computer display device configured to display, in the one or more graphical visualizations in the graphical user interface of the computer display device, one or more line charts comprising one or more graph lines corresponding to one or more years of aggregated event data, graphing the aggregated event data values against a period of time.

* * * * *